(12) United States Patent
Lin et al.

(10) Patent No.: US 9,077,518 B2
(45) Date of Patent: Jul. 7, 2015

(54) DOWNLINK TRANSMIT BEAMFORMING

(71) Applicant: INTEL CORPORATION, Santa Clara, CA (US)

(72) Inventors: Xintian E. Lin, Mountain View, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/175,381

(22) Filed: Feb. 7, 2014

(65) Prior Publication Data

US 2014/0153662 A1 Jun. 5, 2014

Related U.S. Application Data

(63) Continuation of application No. 13/405,535, filed on Feb. 27, 2012, now Pat. No. 8,660,105, which is a continuation of application No. 12/752,517, filed on Apr. 1, 2010, now Pat. No. 8,125,923, which is a continuation of application No. 11/027,300, filed on Dec. 30, 2004, now Pat. No. 7,719,993.

(51) Int. Cl.
*H04L 12/26* (2006.01)
*H04L 1/06* (2006.01)
*H04B 7/06* (2006.01)
*H04B 7/04* (2006.01)

(52) U.S. Cl.
CPC ............ *H04L 1/0681* (2013.01); *H04B 7/0617* (2013.01); *H04B 7/0643* (2013.01); *H04B 7/0413* (2013.01)

(58) Field of Classification Search
CPC .................. H04B 17/0097; H04B 7/0417
USPC .......... 455/69, 70, 101–103, 500, 525, 435.1; 370/252, 264, 335, 390; 375/219, 224, 375/227, 260, 267, 299, 349
See application file for complete search history.

(56) References Cited

U.S. PATENT DOCUMENTS

| 5,596,322 A | 1/1997 | Marsh et al. |
| 6,070,090 A | 5/2000 | Feuerstein |
| 6,144,711 A | 11/2000 | Raleigh et al. |
| 6,167,286 A | 12/2000 | Ward et al. |
| 6,320,540 B1 | 11/2001 | Meredith |

(Continued)

FOREIGN PATENT DOCUMENTS

| TW | 283282 A | 8/1996 |
| TW | 200408203 A | 5/2004 |

(Continued)

OTHER PUBLICATIONS

"Section 20.3.12.1 Implicit feedback beamforming", Part 11: Wireless LAN Medium Access Control (MAC) and Physical Layer (PHY) Specifications, IEEE Std 802.11n-2009, Local and Metropolitan Area Networks, Oct. 29, 2009, pp. 304-306.

(Continued)

*Primary Examiner* — Cong Tran
(74) *Attorney, Agent, or Firm* — Alpine Technology Law Group LLC

(57) ABSTRACT

A wireless network access point can operate as a closed loop MIMO device when communicating with a station that is operating as an open loop MIMO device. Transmit/receive chains in the access point are calibrated to support aggregate channel reciprocity.

18 Claims, 7 Drawing Sheets

(56) References Cited

U.S. PATENT DOCUMENTS

| | | |
|---|---|---|
| 6,493,664 B1 | 12/2002 | Udaya Bhaskar et al. |
| 6,778,612 B1 | 8/2004 | Lozano et al. |
| 6,980,527 B1 | 12/2005 | Liu et al. |
| 7,075,906 B2 | 7/2006 | Douglas et al. |
| 7,280,625 B2 | 10/2007 | Ketchum et al. |
| 7,366,245 B2 | 4/2008 | Li et al. |
| 7,460,494 B2 | 12/2008 | Sandhu |
| 7,486,740 B2 * | 2/2009 | Inanoglu ............... 375/267 |
| 2003/0002450 A1 | 1/2003 | Jalali et al. |
| 2003/0112966 A1 | 6/2003 | Halder et al. |
| 2003/0224750 A1 | 12/2003 | Sampath |
| 2004/0066754 A1 | 4/2004 | Hottinen |
| 2004/0085939 A1 | 5/2004 | Wallace et al. |
| 2004/0157646 A1 | 8/2004 | Raleigh et al. |
| 2004/0165684 A1 | 8/2004 | Ketchum et al. |
| 2005/0002467 A1 | 1/2005 | Seo et al. |
| 2005/0009483 A1 | 1/2005 | Eilts et al. |
| 2005/0037799 A1 | 2/2005 | Braun et al. |
| 2005/0047384 A1 * | 3/2005 | Wax et al. ............. 370/338 |
| 2005/0095996 A1 * | 5/2005 | Takano ................. 455/91 |
| 2005/0101259 A1 | 5/2005 | Tong et al. |
| 2005/0111376 A1 | 5/2005 | Raghothaman et al. |
| 2005/0227628 A1 | 10/2005 | Inanoglu |
| 2006/0025079 A1 | 2/2006 | Sutskover et al. |
| 2007/0037524 A1 | 2/2007 | Ishii et al. |
| 2007/0105595 A1 | 5/2007 | Prasad et al. |

FOREIGN PATENT DOCUMENTS

| | | |
|---|---|---|
| TW | 200417176 A | 9/2004 |
| WO | 2004/038952 A2 | 5/2004 |
| WO | 2006/031506 A1 | 3/2006 |

OTHER PUBLICATIONS

Shelton, N. B., et al., "A Robust Iterative Algorithm for Wireless MIMO Array Auto-Calibration", International conference on montreal, Quebec, Canada, Piscataway, NJ, USA, 2; Acoustics, speech, and signal processing, 2004, proceedings, (ICASSP'04), IEEE, XP010717907, ISBN: 0-7803-8484-9, May 17-21, 2004; pp. 341-344.

Office Action received for United Kingdom Patent Application No. 0700386.6, mailed on Mar. 2, 2009, 1 page.

Office Action received for United Kingdom Patent Application No. 0700386.6, mailed on Sep. 19, 2008, 1 page.

Office Action received for German Patent Application No. 112005002157.2, mailed on Jun. 30, 2009, 4 pages of German Office Action and 4 pages of English Translation.

Office Action received for Chinese Patent Application No. 200580030257.0, mailed on Jan. 31, 2012, 3 pages of Chinese Office Action and 4 pages of English Translation.

Office Action received for Chinese Patent Application No. 200580030257.0, mailed on May 8, 2009, 10 pages of Chinese Office Action and 18 pages of English Translation.

Office Action received for Chinese Patent Application No. 200580030257.0, mailed on Aug. 3, 2010, 10 pages of Chinese Office Action and 17 pages of English Translation.

Office Action received for Chinese Patent Application No. 200580030257.0, mailed on Aug. 3, 2011, 8 pages of English Translation only.

Office Action received for Chinese Patent Application No. 200580030257.0, mailed on Nov. 27, 2009, 10 pages of Chinese Office Action and 17 pages of English translation.

International Preliminary Report on Patentability received for PCT Patent Application No. PCT/US2005/031681, mailed on Mar. 22, 2007, 6 pages.

International Search Report and Written Opinion received for PCT Patent Application No. PCT/US2005/031681, mailed on Feb. 6, 2006, 10 pages.

Notice of Allowance received for Chinese Patent Application No. 200580030257.0, mailed on Jul. 4, 2012, 4 pages including 2 pages of English Translation.

Office Action received for Taiwanese Patent Application No. 94129087, mailed on Dec. 6, 2006, 1 page of English Translation.

Notice of Allowance received for Taiwanese Patent Application No. 94129087, mailed on Sep. 30, 2008, 5 pages including 1 page of English Translation.

* cited by examiner

DOWNLINK TRANSMIT BEAMFORMING

CROSS-REFERENCE TO RELATED APPLICATIONS

The present application is a continuation of U.S. application Ser. No. 13/405,535 filed Feb. 27, 2012, pending, which is a continuation of U.S. application Ser. No. 12/752,517 filed Apr. 1, 2010, now U.S. Pat. No. 8,125,923, which is continuation of U.S. application Ser. No. 11/027,300 filed Dec. 30, 2004, now U.S. Pat. No. 7,719,993. Said application Ser. Nos. 13/405,535, 12/752,517 and 11/027,300 are hereby incorporated by reference herein in their entireties.

FIELD

The present invention relates generally to wireless networks, and more specifically to wireless networks that utilize multiple antennas.

BACKGROUND

Wireless networks are evolving to take advantage of multiple antennas at both access points (APs) and mobile stations (STAs). For example, various multiple-input-multiple-output (MIMO) protocols have been developed to utilize multiple antennas at both an AP and STA. Closed loop MIMO protocols call for transmitting channel state information from a receiver to a transmitter. Devices that adhere to closed loop MIMO protocols typically consume some communications bandwidth to transmit channel state information, but gain performance as a result. Open loop MIMO protocols generally do not require the transmission of channel state information. Devices that adhere to open loop MIMO protocols tend to be simpler and cheaper than closed loop MIMO devices, however they also tend to have poorer performance.

DESCRIPTION OF EMBODIMENTS

Figure 1:
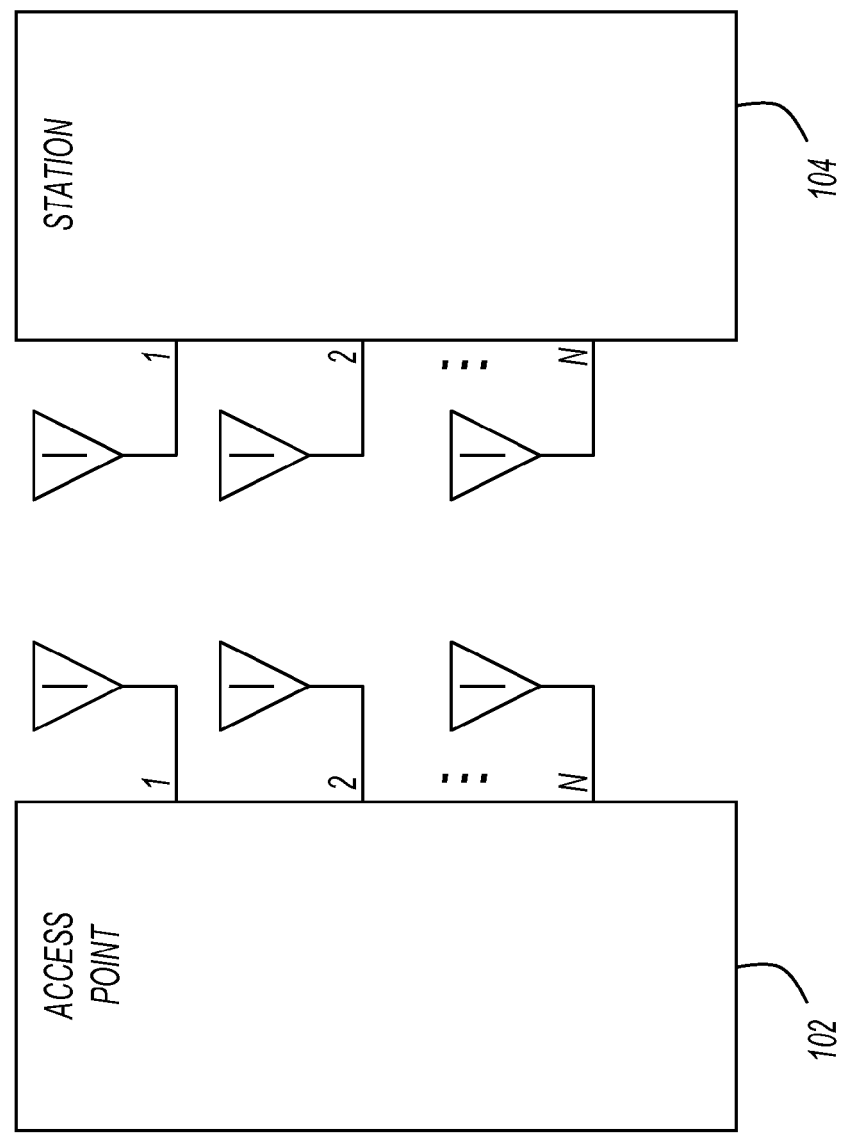
FIG. 1 shows a diagram of a wireless network access point and a wireless station.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of wireless network access point (AP) 102 and wireless station (STA) 104. In some embodiments, AP 102 and STA 104 are part of a wireless local area network (WLAN). For example, STA 104 may be a mobile station such as a laptop computer, personal digital assistant (PDA), or the like. Further, in some embodiments, AP 102 and STA 104 are part of a wireless wide area network (WWAN).

In some embodiments, AP 102 and STA 104 may operate partially in compliance with, or completely in compliance with, a wireless network standard. For example, AP 102 and STA 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, AP 102 and STA 104 may operate partially in compliance with any other standard, including any present or future IEEE wide area network standard such as IEEE 802.16.

AP 102 and STA 104 each include multiple antennas. Each of AP 102 and STA 104 are shown in FIG. 1 having "N" antennas, where N may be any number. In some embodiments, AP 102 and STA 104 have an unequal number of antennas. The "channel" through which AP 102 and STA 104 communicate may include many possible signal paths. For example, when AP 102 and STA 104 are in an environment with many "reflectors" (e.g. walls, doors, or other obstructions), many signals may arrive from different paths. This condition is known as "multipath." In some embodiments, AP 102 and STA 104 utilize multiple antennas to take advantage of the multipath and to increase the communications bandwidth. For example, in some embodiments, AP 102 and STA 104 may communicate using Multiple-Input-Multiple-Output (MIMO) techniques. In general, MIMO systems offer higher capacities by utilizing multiple spatial channels made possible by multipath.

In some embodiments, AP 102 and STA 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small frequency subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open loop MIMO systems, there is no feedback transmission from the receiver to the transmitter. In closed loop systems, communications bandwidth is utilized to transmit current channel state information or conduct channel sounding between stations, and thereby reducing overall throughput. The communications bandwidth used for this purpose is referred to herein as "feedback bandwidth." When feedback bandwidth is reduced in closed loop MIMO systems, more bandwidth is available for data communications.

In some embodiments, a MIMO system may operate in either an open loop mode or a closed loop mode depending on the abilities of the AP 102 and/or STA 104. For example, AP 102 may be capable of operating in either open or closed loop mode, while STA 104 may be only able to operate in open loop mode. This scenario may exist in some system deployments to reduce the cost of STAs. For example, a user may be willing to pay more for an AP than for a STA, and so the AP may have more capabilities than the STA.

Various embodiments of the present invention provide methods and apparatus in which AP 102 supports a closed loop protocol but the lower cost STA 104 only supports an open loop protocol. Downlink performance may be enhanced using an AP that supports a closed loop protocol. In some embodiments, the more powerful AP conducts calibration and learns channel state information (CSI) through uplink open loop traffic. In the downlink, the AP treats each receive antenna of one STA as an independent station and performs spatial division multiple access (SDMA) so that the interferences between spatial streams are removed and adaptive modulation can be employed on each spatial stream.

Figure 2:
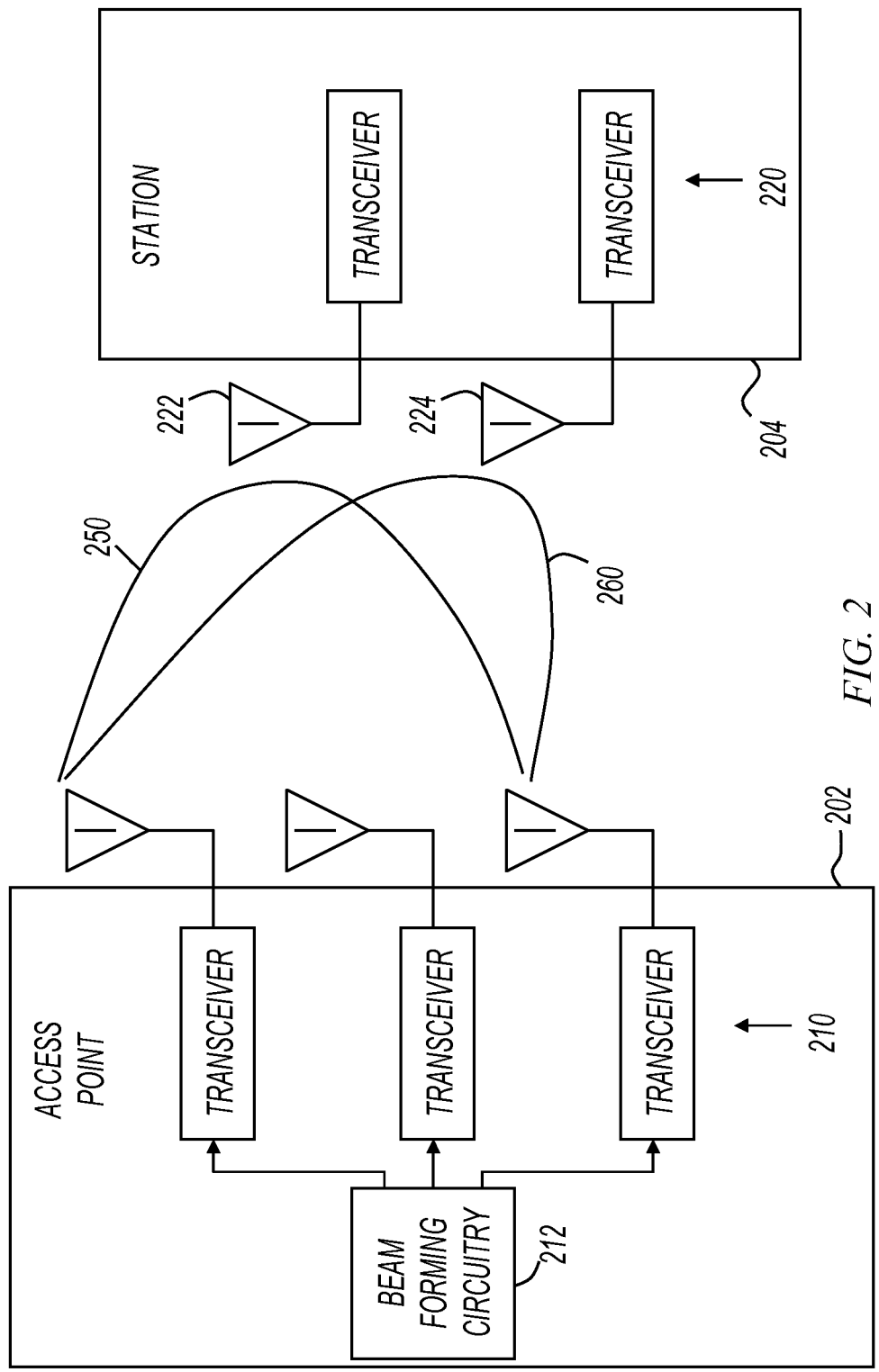
FIG. 2 shows an access point that forms two beams.

FIG. 2 shows an access point having two transmit antenna beams. Access point 202 includes transceivers 210, and STA 204 includes transceivers 220. Access point 202 also includes beamforming circuitry 212. The system shown in FIG. 2 represents a 3×2 system where AP 202 has three transmit antennas and STA 204 has two receive antennas, and in various embodiments of the present invention, beamforming circuitry 212 is utilized to cause transmit beams 250 and 260 to form. AP 202 treats antennas 222 and 224 as two separate stations and forms two beams pointing the two receive antennas with no interference in the receiver. These concepts and others are described in more detail with reference to the remaining figures.

Figure 3:
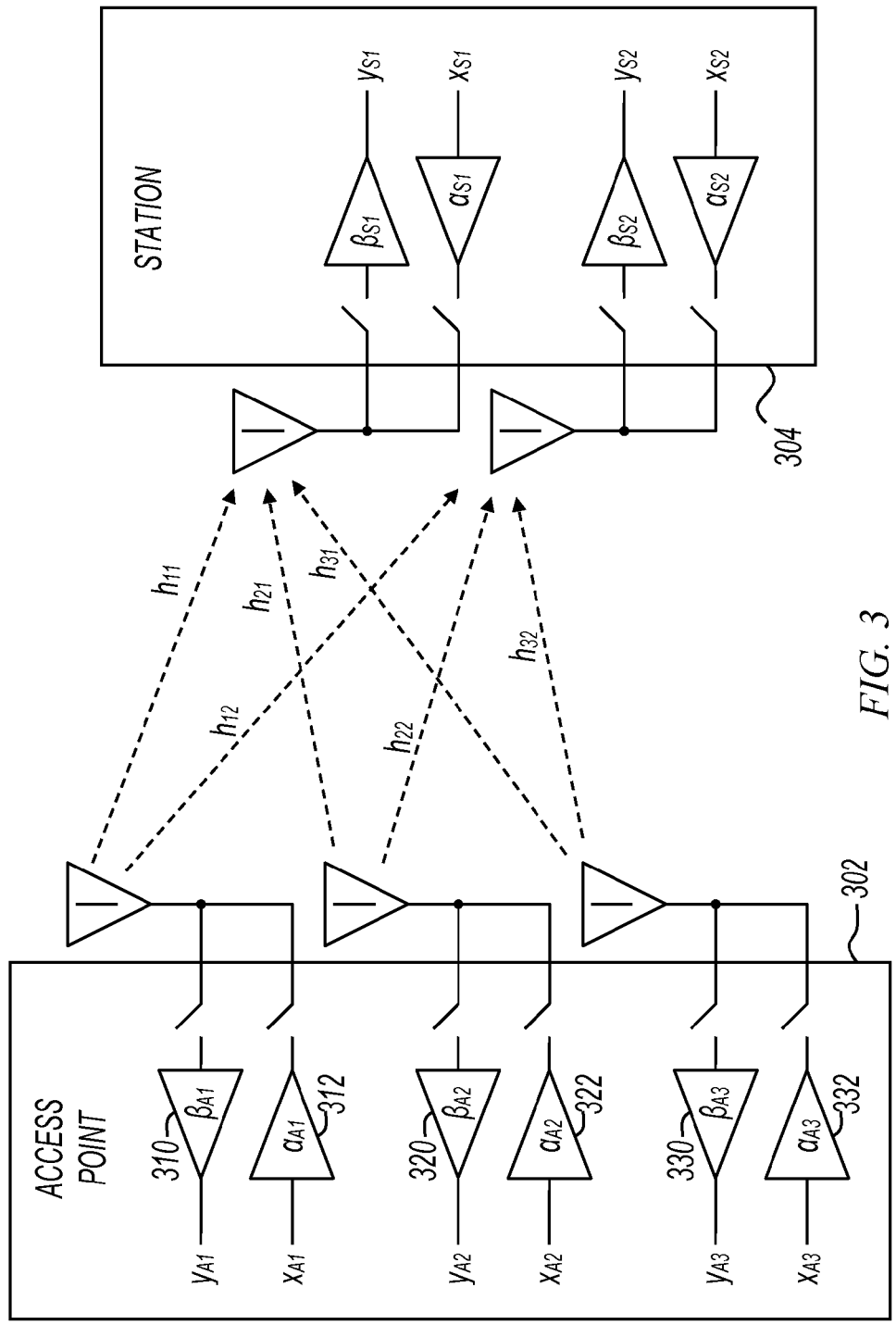
FIG. 3 shows an access point and a mobile station.

FIG. 3 shows an access point and a mobile station. Access point 302 includes transmit chains 312, 322, and 332, and also includes receive chains 310, 320, and 330. Transmit chain 312 is paired with receive chain 310 to form one transmit/receive chain pair; transmit chain 322 is paired with receive chain 320 to form a second transmit/receive chain pair; and transmit chain 332 is paired with receive chain 330 to form a third transmit/receive chain pair.

Each transmit chain may include components such as amplifiers, mixers, inverse fast Fourier transform (IFFT) blocks, digital-to-analog converters, or the like. Likewise, each receive chain may include components such as amplifiers, mixers, FFT blocks, analog-to-digital converters, or the like. Station 304 also includes transmit chains and receive chains formed into transmit/receive chain pairs.

For the purposes of describing the operation of FIG. 3, it is assumed that access point 302 can operate in close loop mode (i.e. beam forming), but that STA 304 cannot. Signals that travel between AP 302 and STA 304 are subjected to effects of the channel through which they travel. For example, as shown in FIG. 3, a complex number $h_{ij}$ is shown between each AP antenna and each STA antenna, where i denotes the AP antenna number, and j denotes the STA antenna number. In general, $h_{ij}$ is a complex number that describes any amplitude and phase variation caused by the channel between the i-th AP antenna and j-th STA antenna. The entire channel (for a given OFDM sub-carrier) in the direction from AP 302 to STA 304 (the "downlink") can be described by a channel matrix H:

$$H = \begin{bmatrix} h_{11} & h_{21} & h_{31} \\ h_{12} & h_{22} & h_{32} \end{bmatrix} \quad (1)$$

and the same channel in the direction from STA 304 to AP 302 (the "uplink") can be described by $H^T$:

$$H^T = \begin{bmatrix} h_{11} & h_{12} \\ h_{21} & h_{22} \\ h_{31} & h_{32} \end{bmatrix} \quad (2)$$

It can be seen that (1) and (2) are related as the inverse of each other. If one of the above channel matrices can be found, then the other matrix can be found by simply performing a transpose. In practice however, AP 302 does not directly measure $H^T$. Instead, AP 302 measures the "aggregate channel" that includes the response of transmitters and receivers in the signal path.

The received signals from STA 304 as measured at AP 302 in the uplink of FIG. 3 is given by $$\begin{bmatrix} y_{A1} \\ y_{A2} \\ y_{A3} \end{bmatrix} = \underbrace{\begin{bmatrix} \beta_{A1} & 0 & 0 \\ 0 & \beta_{A2} & 0 \\ 0 & 0 & \beta_{A3} \end{bmatrix} \begin{bmatrix} h_{11} & h_{12} \\ h_{21} & h_{22} \\ h_{31} & h_{32} \end{bmatrix} \begin{bmatrix} \alpha_{S1} & 0 \\ 0 & \alpha_{S2} \end{bmatrix}}_{H_u} \begin{bmatrix} x_{S1} \\ x_{S2} \end{bmatrix} \quad (3)$$

where $x_{S1}$ and $x_{S2}$ are the signals sent to the AP; $y_{A1}$, $y_{A2}$, and $y_{A3}$ are the received signal at the output of the AP's receive chains; $a_{S1}$ and $a_{S2}$ are the transmit chain gains of the two station's transmit chains; $\beta_{A1}$, $\beta_{A2}$ and $\beta_{A3}$ are the receive chain gains of the AP's receive chains. $H_u$ is referred to herein as the "aggregate uplink channel."

The received signals at STA 304 from AP 302 in the downlink of FIG. 3 is given by $$\begin{bmatrix} y_{S1} \\ y_{S2} \end{bmatrix} = \underbrace{\begin{bmatrix} \beta_{S1} & 0 \\ 0 & \beta_{S2} \end{bmatrix} \begin{bmatrix} h_{11} & h_{21} & h_{31} \\ h_{12} & h_{22} & h_{32} \end{bmatrix} \begin{bmatrix} \alpha_{A1} & 0 & 0 \\ 0 & \alpha_{A2} & 0 \\ 0 & 0 & \alpha_{A3} \end{bmatrix}}_{H_d} \begin{bmatrix} x_{A1} \\ x_{A2} \\ x_{A3} \end{bmatrix} \quad (4)$$

where $y_{S1}$ and $y_{S2}$ are the received signal at the output of the station's receive chains; $x_{A1}$, $x_{A2}$, and $x_{A3}$ are the signals sent to the station; $\alpha_{A1}$, $\alpha_{A2}$ and $\alpha_{A3}$ are the transmit chain gains of the three AP's transmit chains; $\beta_{S1}$ and $\beta_{S2}$ are the receive chain gains of the station's receive chains. $H_d$ is referred to herein as the "aggregate downlink channel."

We define two aggregate channels, $H_u$ and $H_d$, as shown in equations (3) and (4). If the aggregate channels maintain reciprocity, i.e., $H_d = H_u^T$, the AP can directly employ the estimated aggregate uplink channel to compute singular value decomposition, and employ the result to perform transmit beamforming. Reciprocity can be substantially maintained between aggregate channels $H_u$ and $H_d$ if the following two conditions are met:

$$\frac{\alpha_{A1}}{\beta_{A1}} = \ldots = \frac{\alpha_{Am}}{\beta_{Am}} = c_k \quad (5)$$

-continued $$\frac{\alpha_{S1}}{\beta_{S1}} = \ldots = \frac{\alpha_{Sn}}{\beta_{Sn}} = b_k \quad (6)$$

where $c_k$ and $b_k$ are two constants for the k-th subcarrier; m and n are the numbers of antennas at the AP and the STA, respectively. Achieving the condition in (5) is referred to as "calibrating" the transmit/receive chain pairs in the AP, and achieving the condition in (6) is referred to as calibrating the transmit/receive chain pairs in the STA.

For the 3×2 system shown in FIG. 3, we assume AP 302 can calibrate its own transmit and receive chains but that STA 304 cannot. Therefore, the channel reciprocity between downlink and uplink is spoiled, if all the transmit and receive responses on both sides are included in the channel. However, since the AP can calibrate its own transmit and receive chains, channel reciprocity holds from the input/output of AP chains up to each transmit/receive chain of the station. In other words, if each antenna on the station side is considered as a separate node, Eq (6) is automatically satisfied because n=1.

Therefore, if AP 302 forms beams to each station antenna, then the channel reciprocity still holds. In various embodiments of the present invention, the AP's transmit/receive chains are calibrated such that the ratios of a transmit gain to the corresponding receive gain are constant for all AP's antennas. When this is achieved, the pseudo-inversion of transpose of $H_u$ can be directly used as the zero-forcing beamforming matrix without calibrating the station's transmit/receive chains. The derivation is next.

The received signals at the stations from a zero-forcing AP in the downlink of FIG. 3 is given by $$\begin{bmatrix} y_{S1} \\ y_{S2} \end{bmatrix} = \begin{bmatrix} \beta_{S1} & 0 \\ 0 & \beta_{S2} \end{bmatrix} H \begin{bmatrix} \alpha_{A1} & 0 & 0 \\ 0 & \alpha_{A2} & 0 \\ 0 & 0 & \alpha_{A3} \end{bmatrix} W \begin{bmatrix} d_1 \\ d_2 \end{bmatrix} \quad (7)$$

where $y_{S1}$ and $y_{S2}$ are the received signal at the output of the station's receive chains; $d_1$ and $d_2$ are the data symbols sent to the stations; W is the zero-forcing beamforming matrix; $\alpha_{A1}$, $\alpha_{A2}$ and $\alpha_{A3}$ are the transmit chain gains of the three AP's transmit chains; $\beta_{S1}$ and $\beta_{S2}$ are the receive chain gains of the station's receive chains. H is the wireless channel matrix for the downlink.

The pseudo-inverse may be used in cases where a normal inverse is not well defined, for example, due to non square matrix or poorly conditioned matrix. For example, a m×n matrix A, with m<n with rank m, the pseudo inverse can be calculated as $$pinv(A) = A^+(AA^+)^{-1}$$

where $A^+$ is the transpose conjugate of A.

If we substitute W with the pseudo-inversion of $H_u^T$, pinv $(H_u^T)$, the Eq. (7), together with Eqs. (1), (2), and (3) can be written as $$\begin{bmatrix} y_{S1} \\ y_{S2} \end{bmatrix} = \begin{bmatrix} \beta_{S1} & 0 \\ 0 & \beta_{S2} \end{bmatrix} H \quad (8)$$

$$\underbrace{\begin{bmatrix} \alpha_{A1} & 0 & 0 \\ 0 & \alpha_{A2} & 0 \\ 0 & 0 & \alpha_{A3} \end{bmatrix} \begin{bmatrix} \beta_{A1}^{-1} & 0 & 0 \\ 0 & \beta_{A2}^{-1} & 0 \\ 0 & 0 & \beta_{A3}^{-1} \end{bmatrix} H^+(HH^+)^{-1} \begin{bmatrix} \alpha_{S1}^{-1} & 0 \\ 0 & \alpha_{S2}^{-1} \end{bmatrix}}_{cI} \begin{bmatrix} d_1 \\ d_2 \end{bmatrix}$$

The expression is further simplified by using the AP calibration condition Eq. (5) and $HH^+(HH^+)^{-1} = I$ and I is an identity matrix.

$$\begin{bmatrix} y_{S1} \\ y_{S2} \end{bmatrix} = c \begin{bmatrix} \beta_{S1}\alpha_{S1}^{-1} & 0 \\ 0 & \beta_{S2}\alpha_{S2}^{-1} \end{bmatrix} \begin{bmatrix} d_1 \\ d_2 \end{bmatrix} \quad (8.1)$$

Therefore the received data stream $[y_{s1}, y_{s2}]$ does not contain cross interference.

Figure 4:
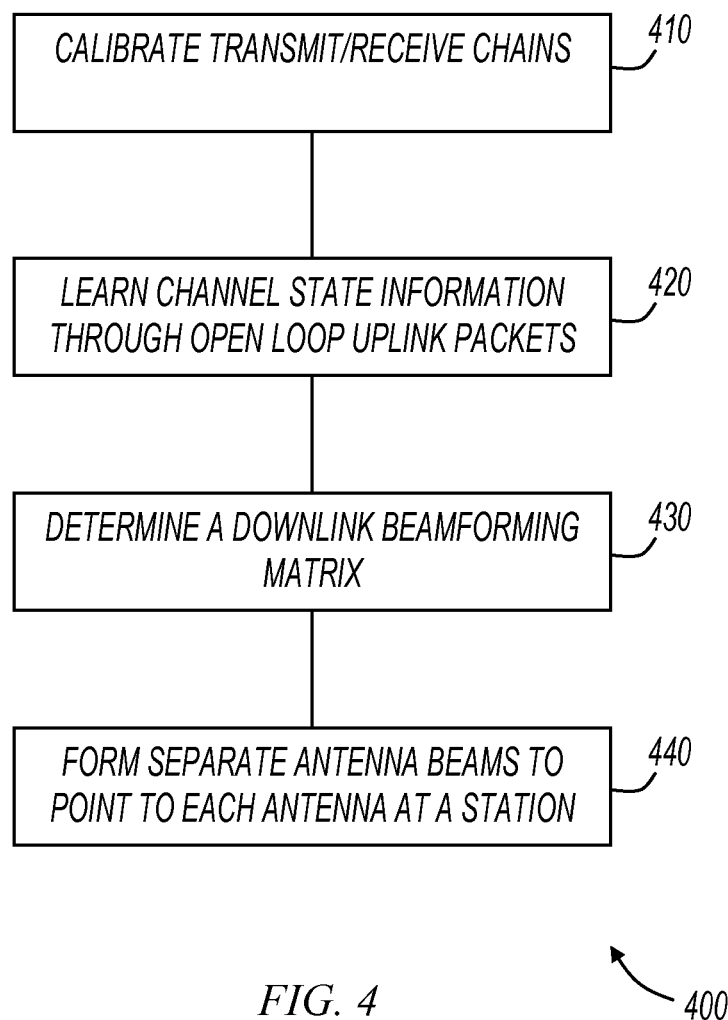
FIG. 4 shows a flowchart in accordance with various embodiments of the present invention.

FIG. 4 shows a flowchart in accordance with various embodiments of the present invention. In some embodiments, method 400 may be used in, or for, a wireless system that utilizes MIMO technology. In some embodiments, method 400, or portions thereof, is performed by a wireless network access point, embodiments of which are shown in the various figures. In other embodiments, method 400 is performed by a processor or electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning at block 410 in which transmit/receive chains are calibrated. Transmit/receive chains in an access point may be calibrated using any of many different mechanisms. Various mechanisms for calibrating transmit/receive chains in an AP are described below with reference to FIGS. 5 and 6. After calibration, the transmit to receive gain ratio of each AP antenna is substantially constant for all antennas. In some embodiments, transmit/receive chains in an AP are calibrated once, and the AP then communicates with one or more STAs. In other embodiments, transmit/receive chains in an AP are calibrated periodically.

At 420, the AP implicitly learns channel state information (CSI) through uplink open loop packets. The AP may obtain CSI from open loop training preambles sent by the station or the data symbols using decision feedback. If the station has very few data to send, it may only employ a single transmit train to send acknowledge (ACK) packets or data packets. In these cases, the AP may designate an open loop MIMO mode for the station using link adaptation protocols so that the station will send one or more packets using all antennas. Then, the AP may send a request-to-send (RTS) packet and cause the station to send an open loop clear-to-send (CTS) packet using all antennas and therefore exercising the full matrix channel. The AP can then obtain the CSI from the CTS packet.

At 430, the AP determines a downlink beamforming matrix, and at 440, the AP forms separate antenna beams to point to each receive antenna and mitigates the inference between the beams by using zero-forcing or minimum mean squared error (MMSE) as follows.

Denote the aggregate downlink channel matrix as $H_d$, which is $M_t$ by $M_r$ and has $M_t > M_r$. For zero-forcing beamforming the received signal at the station is given by $$\begin{bmatrix} r_1 \\ \vdots \\ r_{M_r} \end{bmatrix} = c \begin{bmatrix} \beta_{S1}\alpha_{S1}^{-1} & 0 \\ & \ddots & \\ 0 & & \beta_{S2}\alpha_{S2}^{-1} \end{bmatrix} \begin{bmatrix} l_1 \\ & \ddots \\ & & l_{M_r} \end{bmatrix} \begin{bmatrix} d_1 \\ \vdots \\ d_{M_r} \end{bmatrix} + \begin{bmatrix} n_1 \\ \vdots \\ n_{M_r} \end{bmatrix} \quad (9)$$

where $M_r$ is the number of receive antennas and also the number of data streams; $l_i$ is the power loading factor of the i-th data stream; $d_i$ is the data symbol in the i-th data stream; $r_i$ is the received signal on the i-th receive antenna; $n_i$ is the additive Gaussian white noise on the i-th receive chain; $l_1, \ldots, l_{M_r}$ normalize the total transmit power and load different powers to different beamformed channels. For the equal power loading case, the performance of the system is substantially equal to that of an open loop $M_r$ by $M_t$ and better than that of $M_r$ by $M_r$, where $M_t > M_r$. For example, for a 4×2 system, the performance of the system with equal power loading is equal to that of 2×4 open loop and better than that of 2×2 open loop.

For MMSE beamforming, the beamformer may be determined by $$W_0 = \arg\, min_w E\left\{ \left\| \frac{HWd}{\sqrt{\sum_i \sum_j \|w_{ij}\|^2}} + n - d \right\|^2 \right\}. \quad (10)$$

and the received signal at the station is given by $$\begin{bmatrix} r_1 \\ \vdots \\ r_{M_r} \end{bmatrix} = HW \begin{bmatrix} d_1 \\ \vdots \\ d_{M_r} \end{bmatrix} + \begin{bmatrix} n_1 \\ \vdots \\ n_{M_r} \end{bmatrix} \quad (11)$$

Method 400 provides a transmit beamforming technique that enhances the performance wireless networks for a typical application scenario where the AP has 3-4 antennas and calibration capability while the mobile station has only 1-2 antennas and only supports open loop MIMO. For a system with 3-4 antennas at the AP and 2 antennas at the station, in the downlink, the proposed scheme fully exploits all transmit antennas to enhance performance rather than only using two antennas at the AP.

Figure 5:
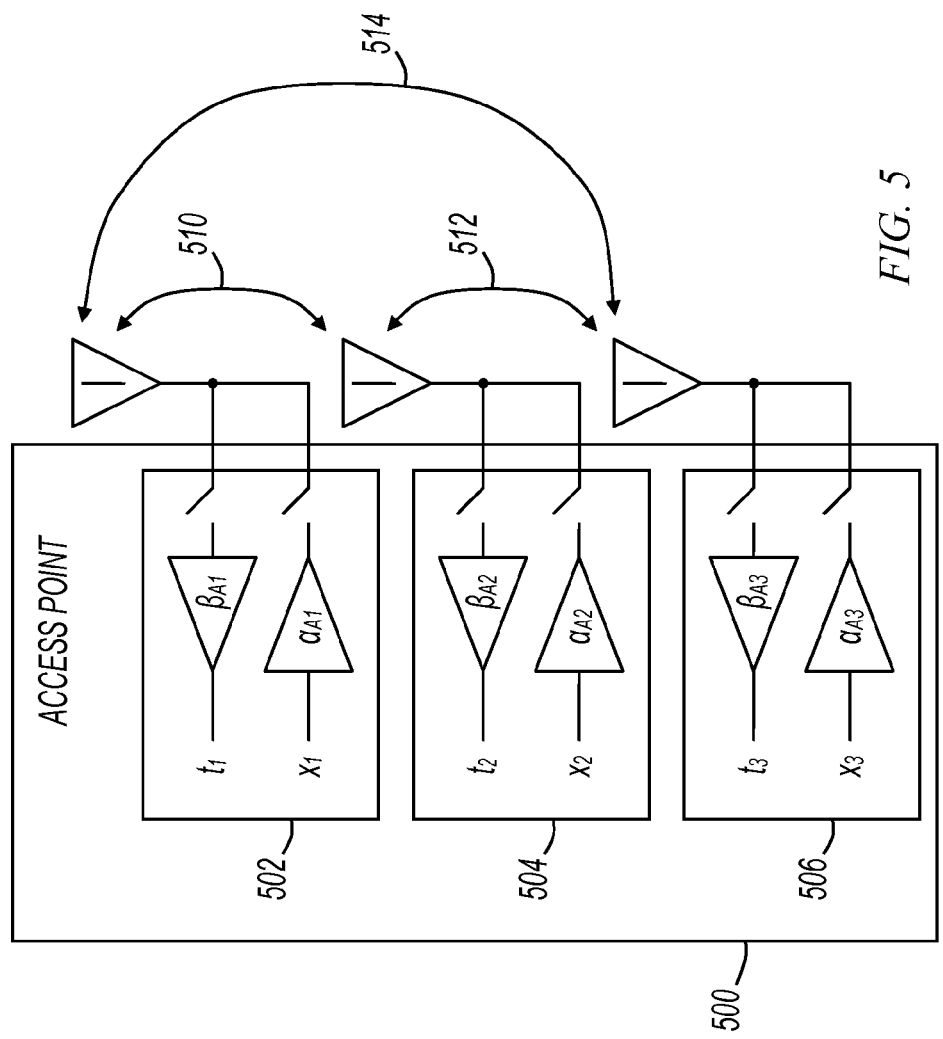
FIG. 5 shows signal paths useful for calibrating transmit/receive chains in a wireless network access point.

FIG. 5 shows signal paths useful for calibrating transmit/receive chains in a wireless network access point. Access point 500 includes transmit/receive chains 502, 504, and 506. Transmit/receive chain 502 transmits calibration signals to transmit/receive chain 504, and vice versa, over channel 510. Transmit/receive chain 504 transmits calibration signals to transmit/receive chain 506, and vice versa, over channel 512. Finally, transmit/receive chain 502 transmits calibration signals to transmit/receive chain 506, and vice versa, over channel 514.

Each calibration pair has an antenna coupling factor $C_{xy}$, where x indicates the identity of the transmitting transmit/receive chain, and y indicates the identity of the receiving transmit/receive chain. Because each transmit/receive chain can transmit or receive calibration signals, then the number of coupling factor $C_{xy}$ equals M×(M−1), where M is the number of transmit/receive chains in the AP. Accordingly, in the illustrated example, 2×3=6 coupling factors $C_{xy}$ exist. And it is noted that $C_{xy} = C_{yx}$ due to reciprocity. FIG. 5 illustrates three transmit/receive chains 502, 504, and 506. In other embodiments, more or fewer transmit/receive chains could be included in AP 500.

The following pseudo-code demonstrates a method to calibrate the transmit/receive chains in AP 500. For example, the method embodied in the following pseudo-code may be utilized to perform the acts of block 410 (FIG. 4). For purposes of description, the terms "transmit chain 1" and "receive chain 1" indicate transmit and receive chains associated with transmit/receive chain 502. Similarly, the terms "transmit chain 2" and "receive chain 2" indicate transmit and receive chains associated with transmit/receive chain 504, and so on. The pseudo-code indicates that the calibration signals are sent and measured in a sequence, although this is not a limitation of the present invention. For example, the sequence may be modified from the example sequence provided without departing from the scope of the present invention. In addition, any transmit/receive chain may be designated as "transmit chain 1" and "receive chain 1."

---

1. Send a training symbol $x_0$ for the n-th OFDM sub-carrier using transmit chain 1.
2. Measure the output of receive chain 2. The measured output is given by $t_{12} = \alpha_{A1}C_{12}\beta_{A2}x_0$, where $C_{12}$ is the response from the input of antenna 1 to the output of antenna 2.
3. Send a training symbol $x_0$ for the n-th sub-carrier using transmit chain 2.
4. Measure the output of receive chain 1. The measured output is given by $t_{21} = \alpha_{A2}C_{21}\beta_{A1}x_0$, where $C_{21}$ is the response from the input of antenna 2 to the output of antenna 1.
5. Adjust $\alpha_{A1}, \alpha_{A2}, \beta_{A1}$ and $\beta_{A2}$ to set $t_{12} = t_{21}$. The simplest way is to vary only the $\beta_{A2}$. The adjustments of the chain gains can be implemented in the digital domain at or after analog-to-digital converters. After the adjustment or compensation, $t_{12} = t_{21}$ gives $$\alpha_{A1}C_{12}\beta_{A2}x_0 = \alpha_{A2}C_{21}\beta_{A1}x_0 \quad (12)$$

6. Since $C_{12} = C_{21}$ due to reciprocity, (12) can be simplified as $$\frac{\alpha_{A1}}{\beta_{A1}} = \frac{\alpha_{A2}}{\beta_{A2}} \quad (13)$$

7. FOR i = 3, ..., M DO
   1) Send a training symbol $x_0$ for the n-th sub-carrier using transmit chain 1.
   2) Measure the output of receive chain i. The measured output is given by $t_{1i} = \alpha_{A1}C_{1i}\beta_{Ai}x_0$, where $C_{1i}$ is the response from the input of antenna 1 to the output of antenna i.
   3) Send a training symbol $x_0$ for the n-th sub-carrier using transmit chain i.
   4) Measure the output of receive chain 1. The measured output is given by $t_{i1} = \alpha_{Ai}C_{i1}\beta_{A1}x_0$, where $C_{i1}$ is the response from the input of antenna i to the output of antenna 1.
   5) Adjust $\alpha_{Ai}$ and $\beta_{Ai}$ to set $t_{1i} = t_{i1}$. The simplest way is to vary only the $\beta_{Ai}$. The adjustments of the chain gains can be implemented in the digital domain at or after analog-to-digital converters. After the adjustment or compensation, $t_{1i} = t_{i1}$ gives $$\alpha_{A1}C_{1i}\beta_{Ai}x_0 = \alpha_{Ai}C_{i1}\beta_{A1}x_0 \quad (14)$$

6) Since $C_{1i} = C_{i1}$ due to reciprocity, (14) can be simplified as $$\frac{\alpha_{A1}}{\beta_{A1}} = \frac{\alpha_{Ai}}{\beta_{Ai}} \quad (15)$$

8. END

---

The pseudo code only shows one example of self calibration. More calibration pairs can be taken. Calibration embodiments represented by FIG. 5 may be referred to as "self-calibration" embodiments, in part because AP 500 provides all of the signals necessary to calibrate the transmit/receive chains. This is in contrast to "mutual calibration" embodiments, described below with reference to FIG. 6.

Figure 6:
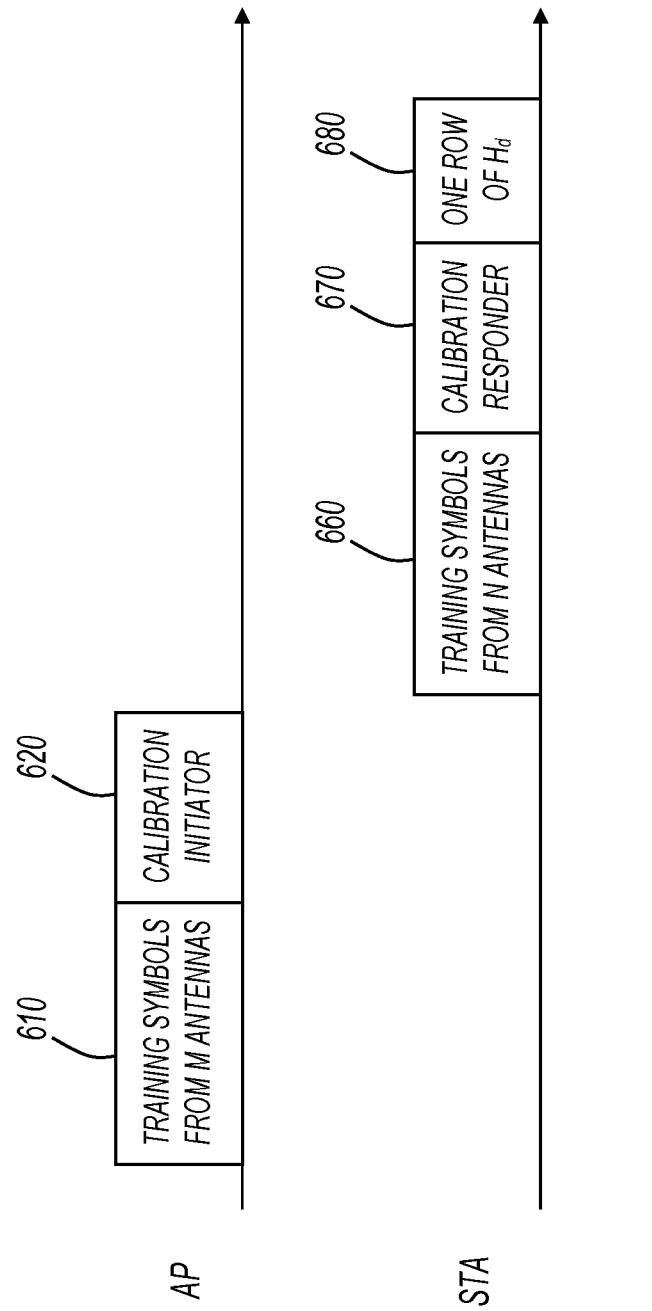
FIG. 6 shows a packet exchange sequence to support calibration of transmit/receive chains in a wireless network access point.

FIG. 6 shows a packet exchange sequence to support calibration of transmit/receive chains in a wireless network access point. For example, the packet exchange shown in FIG. 6 may be used to calibrate an access point's transmit/receive chains to satisfy equation (5). As shown at 610, the AP sends training symbols from its m antennas. In some embodiments, the training symbols may be sent one per antenna, and in other embodiments, the training symbols may be sent using antenna/tone interleaving. A calibration initiation packet 620 may also be sent with the training symbols. The calibration initiation packet indicates that the training symbols are for calibration and requests feedback from the receiver. In the example of FIG. 6, the receiver is a station (STA). The station responds to the calibration initiation packet by sending one training symbol from one antenna (or n training symbols 660 from n antennas), a calibration responder packet 670, and one or more packets 680 having a row of the aggregate downlink channel matrix $H_d$.

In some embodiments, a STA may send back only one training symbol using one antenna. In these embodiments, the feedback row of $H_d$ has to correspond to the STA's transmit antenna. For example, if the STA sends one training symbol from its second antenna, then the feedback row is the second row of $H_d$. Further, in some embodiments, an AP with multiple transmit/receive chains may calibrate itself by communicating with a STA having a single antenna. In these embodiments, $H_d$ only has one row. Namely, one row of $H_d$ corresponds to one STA receive antenna. Equations (16)-(19) below may be utilized in embodiments with a single antenna at the STA, or a single training symbol sent from the STA.

After receiving the training symbol and the row of the downlink response $H_d$, the AP may perform calibration of the transmit/receive chains within the AP. The processing is as follows.

For the k-th sub-carrier, the element in $H_d$ and $H_u$ can be written as $$h_{ij}^d = \alpha_i^A h_{ij} \beta_j^S \tag{16}$$

$$h_{ji}^u = \beta_i^A h_{ij} \alpha_j^S \tag{17}$$

Denote $$l_{ij} = \frac{h_{ij}^d}{h_{ji}^u}; r_i^A = \frac{\alpha_i^A}{\beta_i^A} \text{ and } r_i^S = \frac{\alpha_i^S}{\beta_i^S}.$$

Dividing (16) by (17) gives $$l_{ij} = \frac{r_i^A}{r_j^S} \tag{18}$$

Calibration information can be computed as the ratio of receiver gain to transmitter gain for each transceiver, or $r_i^A$ for $i=1, \ldots, m$. Without loss of generality, chains $2, \ldots, m$ may be calibrated with respect to chain 1. For example, $r_i^A$ may be determined for $i=2, \ldots, m$ in terms of $r_1^A$ and $l_{i1}$ for $i=1, \ldots, m$. The computation of $r_i^A$ for $i=2, \ldots, m$ is as follows.

$$r_i^A = l_{i1} r_1^S = l_{i1} \frac{r_1^A}{l_{11}} = \frac{l_{i1}}{l_{11}} r_1^A \tag{19}$$

Similarly, the computation of $r_j^S$ for $j=1, \ldots, n$ is as follows.

$$r_j^S = r_1^A / l_{1j} \tag{20}$$

Equations (19) and (20) may be used for the calibrations of the AP and station respectively. For the scheme in FIG. 6, only equation (19) is needed and therefore only one row of $H_d$ is needed to feedback from the station. The AP may adjust its receive or transmit chains according to the computed $r_i^A$ so that equation (5) is satisfied. For example, a receiver gain may be modified using an AGC circuit, a digitally controlled gain circuit, a numerical multiplier, or any other suitable mechanism. Likewise, a transmitter gain may be modified by pre-processing digital data to be transmitted, controlled amplifier gain, or any other suitable mechanism. When equation (5) is satisfied, or approximately satisfied, the AP transmit/receive chains are said to be calibrated.

Mutual calibration performed in accordance with embodiments represented by FIG. 6 may be performed with one access point, and the AP may communicate with stations other than the station used for mutual calibration. For example, referring now back to FIG. 4, one station may be used for mutual calibration at 410, and the AP may utilize the calibrated transmit/receive chains to communicate with different stations at 440.

Figure 7:
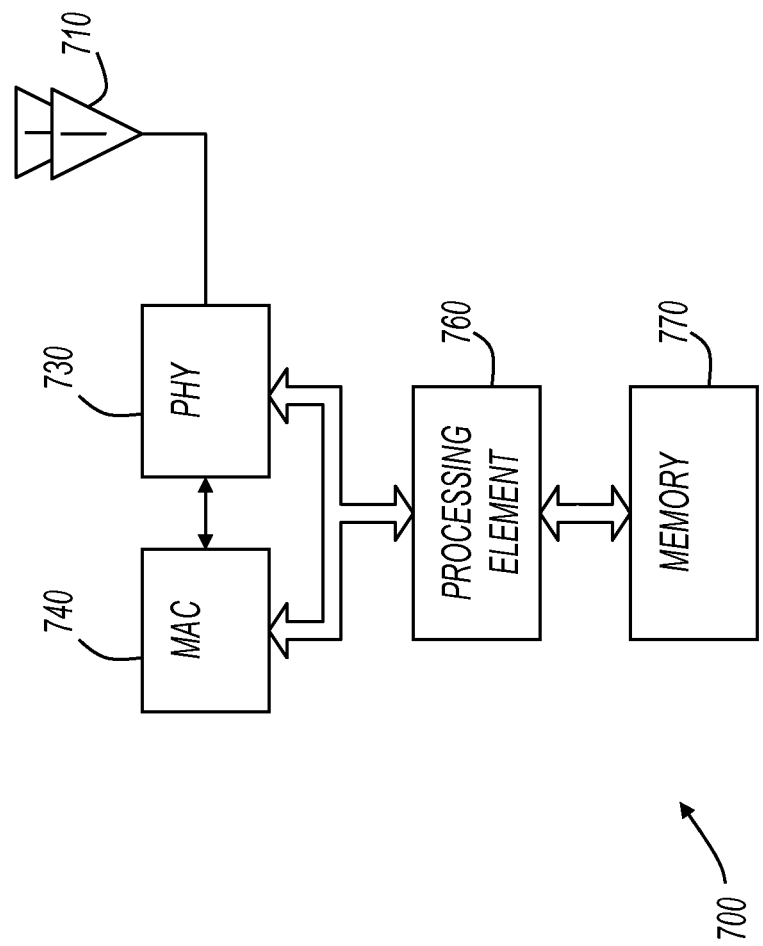
FIG. 7 shows a diagram of an electronic system.

FIG. 7 shows a system diagram in accordance with various embodiments of the present invention. Electronic system 700 includes antennas 710, physical layer (PHY) 730, media access control (MAC) layer 740, processing element 760, and memory 770. PHY 730 and MAC 740 implement functionality in a communications protocol stack. In some embodiments, electronic system 700 may be a wireless network access point capable of calibrating transmit/receive chains and forming separate downlink transmit antenna beams to communicate with multiple antennas on a single station as described above with reference to the previous figures. In addition, electronic system 700 may be an access point capable of performing the calculations shown in any of the equations above.

In some embodiments, electronic system 700 may represent a system that includes an access point as well as other circuits. For example, in some embodiments, electronic system 700 may be a computer, such as a personal computer, a workstation, or the like, that includes an access point as a peripheral or as an integrated unit. Further, electronic system 700 may include a series of access points that are coupled together in a network.

In operation, system 700 sends and receives signals using antennas 710, and the signals are processed by the various elements shown in FIG. 7. Antennas 710 may be an antenna array or any type of antenna structure that supports MIMO processing. System 700 may operate in partial compliance with, or in complete compliance with, a wireless network standard such as an 802.11 standard.

Physical layer (PHY) 730 is coupled to antennas 710 to interact with a wireless network. PHY 730 may include circuitry to support the transmission and reception of radio frequency (RF) signals. For example, in some embodiments, PHY 730 includes RF receiver chains to receive signals and perform "front end" processing such as low noise amplification (LNA), filtering, frequency conversion or the like. Further, in some embodiments, PHY 730 includes transform mechanisms and beamforming circuitry to support MIMO signal processing. Also for example, in some embodiments, PHY 730 includes circuits to support frequency up-conversion, and RF transmitter chains. In addition, PHY 730 may include variable gain circuits that allow for calibrating transmitter/receiver gain as described above with reference to the previous figures.

PHY 730 may be partially or completely controlled by processing element 760. For example, processing element 760 may determine a beamforming matrix to be used by PHY 730. Also for example, processing element 760 may manipulate transmit/receive chains to alter gain elements or to perform self calibration as described above.

Media access control (MAC) layer 740 may be any suitable media access control layer implementation. For example, MAC 740 may be implemented in software, or hardware or any combination thereof. In some embodiments, a portion of MAC 740 may be implemented in hardware, and a portion may be implemented in software that is executed by processing element 760. Further, MAC 740 may include a processor separate from processing element 760.

Processing element 760 is operatively coupled to MAC 740 and PHY 730. For example, processing element 760 may cause PHY 730 to perform certain signal processing operations, or may cause MAC 740 to generate or send specific packets or packet types. In operation, processing element 760 reads instructions and data from memory 770 and performs actions in response thereto. For example, processing element 760 may access instructions from memory 770 and perform method embodiments of the present invention, such as method 400 (FIG. 4) or methods described with reference to other figures. Processing element 760 represents any type of processor, including but not limited to, a microprocessor, a digital signal processor, a microcontroller, or the like.

Memory 770 represents an article that includes a machine readable medium. For example, memory 770 represents a random access memory (RAM), dynamic random access memory (DRAM), static random access memory (SRAM), read only memory (ROM), flash memory, or any other type of article that includes a medium readable by processor 760. Memory 770 may store instructions for performing the execution of the various method embodiments of the present invention. Memory 770 may also store channel state matrices or calibration information.

Although the various elements of system 700 are shown separate in FIG. 7, embodiments exist that combine the circuitry of processing element 760, memory 770, and MAC 740 in a single integrated circuit. For example, memory 770 may be an internal memory within processing element 760 or may be a microprogram control store within processing element 760. In some embodiments, the various elements of system 700 may be separately packaged and mounted on a common circuit board. In other embodiments, the various elements are separate integrated circuit dice packaged together, such as in a multi-chip module, and in still further embodiments, various elements are on the same integrated circuit die.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   calibrating a plurality of transmit/receive chains in a wireless network access point device, wherein calibrating comprises adjusting gain values to make transmitter gain to receiver gain ratios substantially equal;
   receiving a packet in an uplink from a station having a first antenna and a second antenna, wherein uplink channel information is determined from the packets received from the station;
   determining a downlink beamforming matrix using the uplink channel information reciprocity to form separate beams for the downlink for the first antenna and the second antenna of the station; and
   transmitting two data streams to the station.

2. A method as claimed in claim 1, wherein said determining the downlink beamforming matrix comprises using a pseudo-inversion of an uplink channel matrix to determine the downlink beamforming matrix from the uplink channel state information.

3. A method as claimed in claim 1, wherein said transmitting two data streams to the station comprises transmitting a first data stream to the first antenna of the station, and transmitting the second data stream to the second antenna of the station.

4. A method as claimed in claim 1, wherein interference between the two data streams is mitigated by using zero-forcing.

5. A method as claimed in claim 1, wherein interference between the two data streams is mitigated by using minimum mean squared error (MMSE).

6. A method as claimed in claim 1, wherein said receiving comprises receiving open loop packets from the station.

7. An access point, comprising:
   two or more antennas;
   a physical layer coupled to the two or more antennas; and
   a media access control layer coupled to the physical layer, wherein the media access control layer is configured to:
      calibrate a plurality of transmit/receive chains in a wireless network access point device, wherein calibrating comprises adjusting gain values to make transmitter gain to receiver gain ratios substantially equal;
      receive a packet in an uplink from a station having a first antenna and a second antenna, wherein uplink channel information is determined from the packets received from the station;
      determine a downlink beamforming matrix using the uplink channel information reciprocity to form separate beams for the downlink for the first antenna and the second antenna of the station; and
      transmit two data streams to the station.

8. An access point as claimed in claim 7, wherein the media access control layer is further configured to use a pseudo-inversion of an uplink channel matrix to determine the downlink beamforming matrix from the uplink channel state information.

9. An access point as claimed in claim 7 wherein the media access control layer is further configured to transmit a first data stream to the first antenna of the station, and transmit the second data stream to the second antenna of the station.

10. An access point as claimed in claim 7, wherein the media access control layer is further configured to mitigate interference between the two data streams by using zero-forcing.

11. An access point as claimed in claim 7, wherein the media access control layer is further configured to mitigate interference between the two data streams by using minimum mean squared error (MMSE).

12. An access point as claimed in claim 7, wherein the packets received from the station comprise open loop packets.

13. An article of manufacture comprising a non-transitory medium having instructions stored thereon that, if executed, result in:
- calibrating a plurality of transmit/receive chains in a wireless network access point device, wherein calibrating comprises adjusting gain values to make transmitter gain to receiver gain ratios substantially equal;
- receiving a packet in an uplink from a station having a first antenna and a second antenna, wherein uplink channel information is determined from the packets received from the station;
- determining a downlink beamforming matrix using the uplink channel information reciprocity to form separate beams for the downlink for the first antenna and the second antenna of the station; and
- transmitting two data streams to the station.

14. An article of manufacture as claimed in claim 13, wherein the instructions, if executed, further result in using a pseudo-inversion of an uplink channel matrix to determine the downlink beamforming matrix from the uplink channel state information.

15. An article of manufacture as claimed in claim 13, wherein the instructions, if executed, further result in transmitting a first data stream to the first antenna of the station, and transmitting the second data stream to the second antenna of the station.

16. An article of manufacture as claimed in claim 13, wherein the instructions, if executed, further result in mitigating interference between the two data streams by using zero-forcing.

17. An article of manufacture as claimed in claim 13, wherein the instructions, if executed, further result in mitigating interference between the two data streams by using minimum mean squared error (MMSE).

18. An article of manufacture as claimed in claim 13, wherein the packets received from the station comprise open loop packets.

* * * * *